Figure 1:
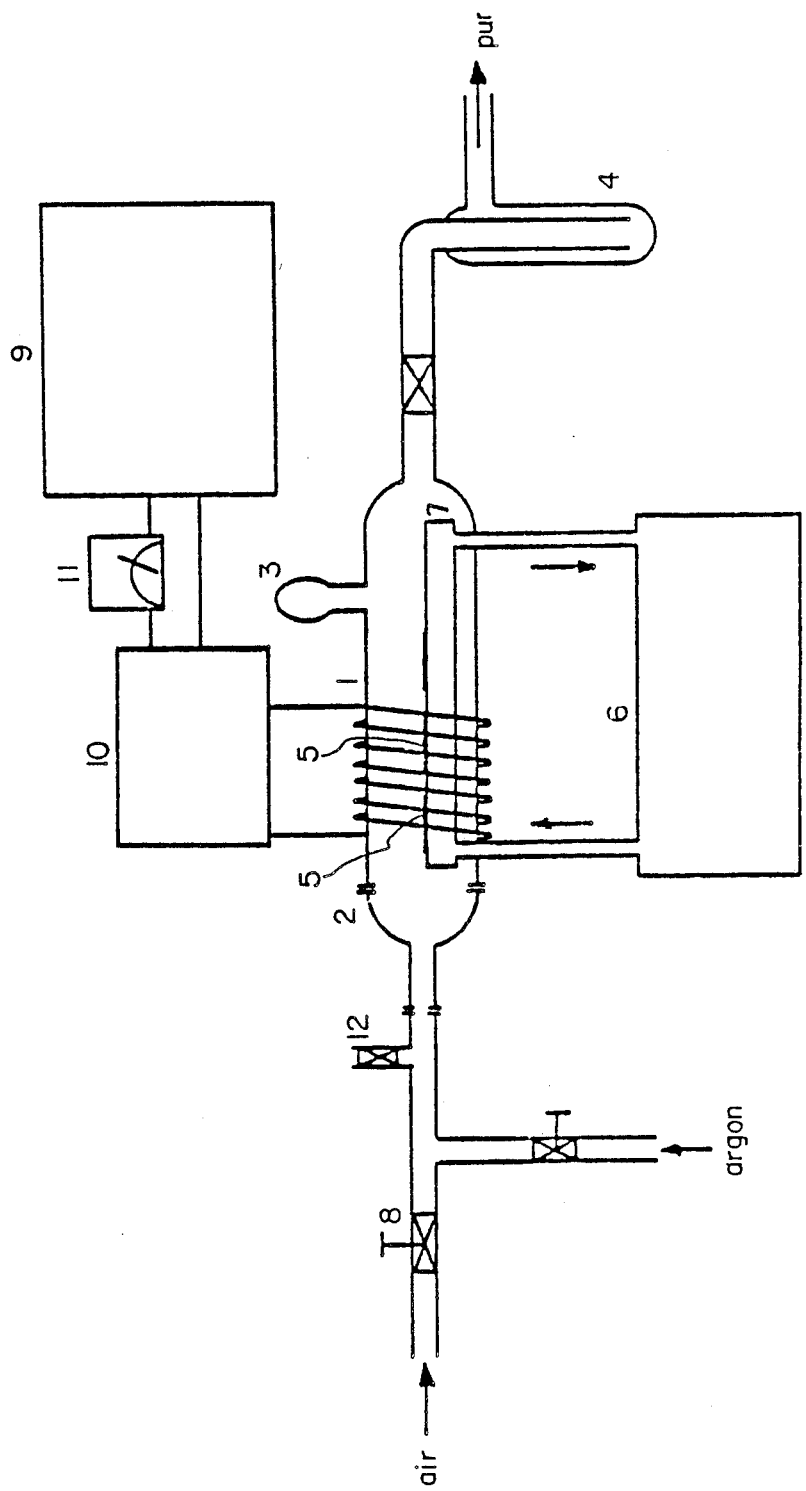
Figure 2:
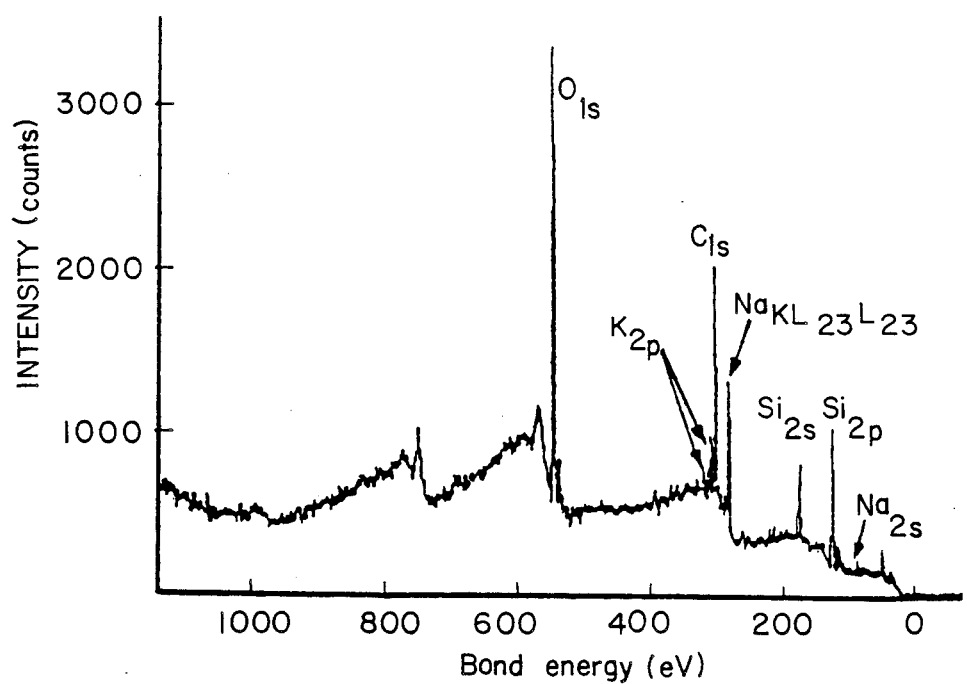
Figure 3:
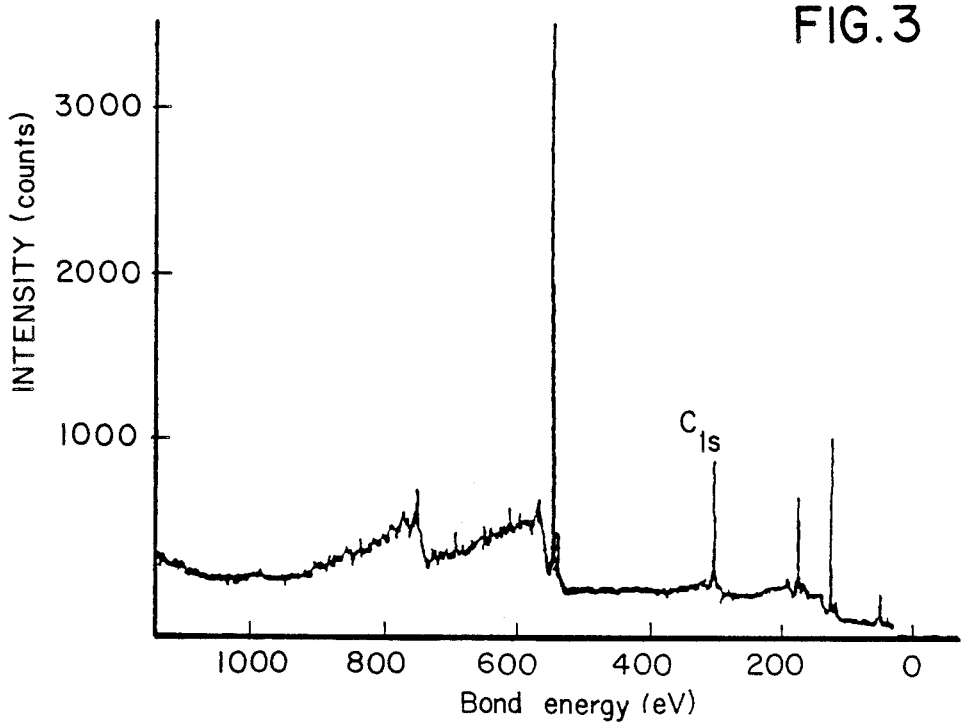

United States Patent [19]

Gruenwald et al.

[11] Patent Number: 4,983,255

[45] Date of Patent: Jan. 8, 1991

[54] PROCESS FOR REMOVING METALLIC IONS FROM ITEMS MADE OF GLASS OR CERAMIC MATERIALS

[76] Inventors: Heinrich Gruenwald, Bachstr. 21, D-7431 Gomaringen, Fed. Rep. of Germany; Hugh S. Munro, 18 Union Place, Durham DH1 3RE, Great Britain

[21] Appl. No.: 384,033

[22] Filed: Jul. 24, 1989

Related U.S. Application Data

[63] Continuation of Ser. No. 22,805, filed as PCT DE86/00209 on May 16, 1986, published as WO86/07051 on Dec. 4, 1986, abandoned.

[30] Foreign Application Priority Data

May 21, 1985 [DE] Fed. Rep. of Germany ....... 3518197
May 16, 1986 [WO] PCT Int'l Appl....PCT/DE86/00209

[51] Int. Cl.$^5$ ..................... C03C 15/00; C03C 25/06
[52] U.S. Cl. ................................. 156/643; 156/662; 204/192.37; 65/3.15; 65/30.1; 65/31
[58] Field of Search ..................... 65/30.1, 31, 3.15; 156/643, 662; 204/192.32, 192.35, 192.37, 192.34

[56] References Cited

U.S. PATENT DOCUMENTS

| | | | |
|---|---|---|---|
| 3,879,183 | 4/1975 | Carlson | 65/30 |
| 4,049,940 | 9/1977 | Moisan et al. | 219/10.55 R |
| 4,110,093 | 8/1978 | Macedo et al. | 65/31 |
| 4,307,179 | 12/1981 | Chang et al. | 156/643 |
| 4,316,791 | 2/1982 | Taillet | 156/345 |
| 4,719,078 | 1/1988 | Miyashita et al. | 264/65 |
| 4,731,156 | 3/1988 | Montmarquet | 156/345 |
| 4,807,016 | 2/1989 | Douglas | 204/192.37 |

FOREIGN PATENT DOCUMENTS

| | | |
|---|---|---|
| 0675631 | 1/1966 | Belgium . |
| 0001837 | 5/1979 | European Pat. Off. . |
| 2428205 | 1/1975 | Fed. Rep. of Germany . |
| 2437811 | 2/1975 | Fed. Rep. of Germany . |
| 1017813 | 10/1975 | Fed. Rep. of Germany . |
| 1067104 | 5/1967 | United Kingdom . |

OTHER PUBLICATIONS

Hanak, "Permanent Holograms in Glass by RF Sputter Etching", RCA Review, vol. 32, Jun. 1971, pp. 319–324.

Bach, "Application of Ion Sputtering in Preparing Glass and Their . . . Investigations J. of Non–Cryst. Solids," 3(1970), 1–32.

Cuomo et al., "Significance of Negative Ion Formation in Sputtering and SIMS Analysis", J. Vac. Sci. Technol. 15(2), 4/1978.

Alfred Sendt, "Der Einfluss der Wasserstoffionen auf die Festigkeit und Chemische Bestandigkeit des Glases", Glastechn. Ber., vol. 37, 2, Feb. 1964, pp. 102–115.

N. H. Ray et al., "Increasing the Strength of Glass by Etching and Ion–Exchange", Journal of Materials Science, vol. 4, 1969, pp. 73–79.

P. D. Davidse et al., "Dielectric Thin Films Through RF Sputtering", Journal of Applied Physics, vol. 37, No. 2, Feb. 1966, pp. 574–579.

W. Kern et al., "Chemical Vapor Deposition of Inorganic Thin Films", Thin Film Processes, Academic Press, 1978, pp. 258–331.

J. R. Hollahan et al., "Plasma Deposition of Inorganic Thin Films", Thin Film Processes, Academic Press, 1978, pp. 335–360.

(List continued on next page.)

*Primary Examiner*—David Simmons
*Assistant Examiner*—Lori Johnson
*Attorney, Agent, or Firm*—Foley & Lardner, Schwartz, Jeffery, Schwaab, Mack, Blumenthal & Evans

[57] ABSTRACT

The invention relates to a process for removing metal ions, particularly sodium, potassium and/or aluminum ions, from the thin outermost layer of items of glass or ceramic materials with enrichment by silicon dioxide, the items being subjected for a pre-specified time to a plasma - low-pressure plasma or corona discharge-induced plasma - , hydrogen, nitrogen or a noble gas being used as discharge gas.

20 Claims, 4 Drawing Sheets

OTHER PUBLICATIONS

R. Glang, "Vacuum Evaporation", Handbook of Thin Film Technology, McGraw Hill, 1970, pp. 1.3–1.130.

R. H. Doremus, "Electrical Conductivity and Ionic Diffusion", Glass Science, 1973, pp. 146–149, 236.

D. J. Newman et al., "Glass–Epoxy Multilayer Materials for Printed Circuits", Physics in Technology, Jan. 1977, pp. 10–17.

H. H. Dunken, "Physikalische Chemie der Glasoberflaeche", VEB Deutscher Verlag fur Grundstoffindustrie, Leisszig, 1981, p. 378.

D. V. McCaughan et al., "Ion Neutralization Processes Insulator Surfaces and Consequent Impurity Migration Effects in $SiO_2$ Films", Physical Review Letters, vol. 30, No. 13, Mar. 26, 1973, pp. 614–617.

J. L. Vossen et al., "Plasma Deposition and Etching Reactors for Semiconductor Applications", Pure & Appl. Chem., vol. 52, 1980, pp. 1759–1765.

D. V. McCaughan et al., "Ion Migration Effects in R.F. Sputter Cleaning of Dielectric Films", Thin Solid Films, vol. 22, 1974, pp. 359–363.

Chemical Abstract #96:186024w, "Mechanical Chemical & Optical Variations Caused by Ion Implantation on Glass Surfaces", Chinellato et al., Riv. Stn. Sper. Vetro, 1981, 11(6), 243–9, (Italian).

Vossen and Kern, "Thin Film Processes", Academic Press N.Y., New York, 1978, pp. 24–29.

PROCESS FOR REMOVING METALLIC IONS FROM ITEMS MADE OF GLASS OR CERAMIC MATERIALS

This application is a continuation of application Ser. No. 07/022,805, filed as PCT DE86/00209 on May 16, 1986, published as WO86/0751 on Dec. 4, 1986, now abandoned.

The invention relates to a process for removing metal ions, above all alkali metal ions, from the surface layer of glass and ceramic items.

In order to reduce the melting point, and thus to simplify processing, cheap types of glass, for example, contain alkali metal, above all sodium and potassium, components. On the other hand, these additives to the basic component $SiO_2$ limit the use of such types of glass. For various reasons, it is desirable to remove these metal ions, after shaping, at least from the surface layer, from objects produced from this glass:

(1). alkali metal ions, above all sodium and lithium, but also potassium ions, cause a certain electrical conductivity in the abovementioned types of glass (R. H. Doremus: "Glass Science", Wiley, New York 1973, p. 146). They cannot be used, for example, as substrate glasses in microelectronics or for the construction of electrical printed circuit boards due to the high surface conductivity (D. J. Newman and M. J. Aggleton, Physics in Technology, Jan. 1977, page 1014 17).

At present, so-called "E glass", which is almost alkali metal-free and which is composed, for example, of 50–55% of $SiO_2$, 8–12% of $B_2O_3$, 13–15% of $Al_2O_3$, 1–2% of $Na_2O+K_2O$, 15–17% of $CaO$ and 3–5% of $MgO$, is used for this (H. H. Dunken: "Physikalische Chemie der Glasoberfläche" [The physical chemistry of the glass surface], VEB Deutscher Verlag fur Grundstoffindustrie, Leisszig (sic) 1981, p. 378). In the meantime, alkali metal contents of 0.1% and less are demanded.

E glass is relatively expensive due to its $B_2O_3$ content. Volatile fluorine compounds can escape during its melting. Measures for the protection of the environment against these substances are an additional cost factor. It is desirable to circumvent these disadvantages by using cheap, conventional glasses whose surface layer has been freed of alkali metal ions. On the other hand, E glasses containing too much alkali metal could be optimized by removing the remaining alkali metal.

(2.) Metal oxide additives in silicate glass increase its refractive index and reflectivity compared to pure $SiO_2$. For certain uses, for example covers of solar collectors, picture glasses or microscopy glasses, inexpensive planar glasses having reduced reflectivity and thus increased light transmission are desirable. In general, the reflectivity of glasses car be reduced by applying coatings whose refractive index is between that of the glass (about 1.5) and that of the air (about 1.0). Two basically different procedures are possible for the production of such an anti-reflection coating:

(a) a thin coating of a suitable material is applied to the glass to be coated.

This can be carried most simply by spraying or dipping. However, the checking of the coating thickness and the homogeneity is difficult. More complicated technically is coating by means of vacuum processes, such as "Chemical Vapour Deposition" (W. Kern and V. S. Ban in "Thin Film Processes", Editors J. L. Vossen and W. Kern, Academic Press, New York 1978, pp. 258–331)

"Plasma Deposition" (J. R. Hollahan and R. S. Rosler, ibid., pp. 335–360)

"Vakuum-Bedampfung" [Vacuum Deposition] (R. Glang in "Handbook of Thin Film Technology", Editors L. I. Maissel and R. Glang, McGraw-Hill, New York 1970, pp. 1.3–1.130)

"Sputtering" (D. S. Campbell, ibid., pp. 5.2–5.25).

The advantage of these vacuum processes is the easy checking of coating thickness and properties by means of the process parameters. The considerable instrumental complexity and the fact that coatings of uneven thickness can be formed, above all on non-planar glass items, is disadvantageous.

(b) However, the reflection-reducing coating can alternately be produced by removing metal ions from the surface layer. The silicate structure which remains has a lower refractive index.

The process is particularly suitable when easily mobile metal ions, such as alkali metal ions, are present. There are also various processes for this method:

application of direct current electrical fields having voltages of several kV (e.g. European Patent 0,001,837 A2, German Offenlegungsschrift 2,437,811 A1). It is generally disadvantageous in these processes that the glasses to be treated must be heated to several hundred degrees centigrade and that the glass surface may be contaminated with electrode material.

Leaching out of alkali metal components using aqueous solutions. However, this requires long process times in the case of hydrolytically stable glasses. The process can be modified by addition of hydrofluoric acid and silicon fluoride to the solution (German Auslegeschrift 1,017,813).

(3.) Metal ions migrating into the internal space from the glass wall of incandescent lamps and discharge lamps alter the spectrum of the emitted light. The intensive light emission of sodium, in particular, represents a problem in the case of lamps for which a constant emission spectrum is required.

(4.) Glass surfaces can be "hardened" by removal of alkali metal ions. The alkali metal-depleted glass of the outer layer has a lower expansion coefficient and exerts a compression strain, which causes the work necessary for crack formation to be increased. The alkali metal ions are removed by the known processes usually by the action of acidic gases, such as HCl or $SO_2$, $SO_3$, $SOCl_2$ etc., together with steam on the hot glass surface, at several hundred degrees centigrade (H. H. Dunken, in loco citato, p. 287; A. Sendt, Glastechn. Ber. 37(2), 1964, 102–115; H. Scholze: "Glas. Natur, Struktur und Eigenschaften" [Glass. Nature, structure and properties] Springer, Berlin 1977, p. 222).

The replacement of potassium by sodium ions has also been proposed as an alternative (N. H. Ray, M. H. Stacey, J. Mat. Sci 4, 1969, 73–79; German Patent 1,771,248).

A further process is the diffusion of alkali metal ions in a direct current field at temperatures close to the deformation temperature of the glass, which causes the ions to be displaced from the anode to the cathode (German Offenlegungsschrift 2,428,205). The necessity for strongly heating the glass items to be treated is again a considerable disadvantage of these processes.

(5.) It is known that the resistance of glass towards ageing (H. Scholze: p. 220), weathering influences (R. H. Doremus, in loco citato, p. 236) and acids (A. Sendt, in loco citato) depends on the alkali metal content of the surface layer. The resistance of alkali metal-containing glasses can be increased by removing the alkali metal ions from the surface layer. This is particularly important for preventing corrosion cf glass optical fibers and for avoiding undesired migration of alkali metal ions from glass vessels in the medical/pharmaceutical field of application. The alkali metal ions can be conventionally removed from the surface, for example, by treating the glass items, heated to several hundred degrees centigrade, with $SO_2$ (R. H. Doremus, in loco citato, p. 236; A. Sendt, in loco citato, p. 110).

It is particularly desirable that several improvements be achieved simultaneously using one process step, for example:

increased light transmission, chemical resistance and mechanical strength of alkali metal-containing silicate glasses for covering solar collectors.

Creation of a surface layer having a low refractive index on glass optical fibers with simultaneous increase of the corrosion resistance and mechanical strength.

Removal of alkali metal ions from medicament containers with simultaneous sterilization.

The invention has the object of designing a process with which, by removing metal ions, above all alkali metal ions, both the electrical surface conductivity and the reflectivity of ready-shaped glass items can be reduced and the chemical resistance and mechanical strength thereof can be improved. Here, the shape of the glass items to be coated is not subject to any limitation. The process makes it possible to treat the glass items at room temperature in order that their volume properties and their shape are not altered. On the other hand, the possibility exists of warming or cooling suitably shaped glass items, for example planar glass or glass fabric, during the process and thereby influencing the speed and intensity of the treatment. The process is also applicable, in an analogous fashion, to enamelled items and items of ceramic and other amorphous or crystalline materials.

The object is achieved, as described in greater detail in the claims, in that metal ions, particularly alkali metal ions, are extracted from the surface to be coated by treatment with a low-pressure plasma or a corona discharge.

The use of low-pressure plasmas for cleaning and etching glass surfaces is known (H. H. Dunken, in loco citato, Chapter 4.4). In this process, the contaminants, particularly organic deposits, are "burnt off" and removed from the surface by the high-energy ions of the plasma in an oxygen-containing discharge gas, preferably air. In the case of longer action, heating of the items and higher energy of the discharge, the surface layer is additionally removed entirely (etched) and a pure surface which is suitable for vapor deposition is produced.

It is furthermore known that the surface of a quartz or glass sheet which is fixed to the cathode of a discharge device is totally removed (sputtered) by ion bombardment at low pressure ($10^{-3}$ Torr) with simultaneous action of a magnetic field (Davidce et al., J. Applied Phys. 1966, 574–79).

It is furthermore known that contaminants, for example sodium, can be displaced into the metal layer from very thin coatings (0.5 μm) of $SiO_2$ which have been deposited on a silicon metal base when the coating is bombarded with high-energy ions (Mc Caughan et al., Phys. Rev Let. 1973, pp. 614–17).

Unexpectedly, low-pressure plasmas can be employed for the selective removal of metal ions, particularly alkali metal ions, from the surface layer of glass or ceramic materials whilst maintaining certain conditions, particularly when using non-oxidizing discharge gases, such as hydrogen, nitrogen or noble gases, which are not usable or not very usable for surface cleaning, without the treated items needing to be heated to accomplish this or an electrical boost needing to be applied. The effect is presumably achieved by a bombardment of the surface with gas ions and with high-energy gas particles which are excited into a metastable state, and also, possibly, by means of the "hard" UV irradiation from the low-pressure plasma or the corona discharge. By means of this treatment, the outermost layer is depleted in alkali metal ions, in particular, and enriched in $SiO_2$, so that it becomes "more similar to quartz" and corresponding glasses or ceramic items have the advantageous properties above. The longer the plasma action, the thicker the "depleted layer".

The treatment of silicate glass items in the low-pressure plasma is advantageously carried out in a reactor comprising quartz glass or coated internally with $SiO_2$, the low-pressure plasma being induced by a high-frequency electric field of, usually, 13.56 MHz (i.e., an alternating current) applied via external electrodes or an external metal coil. In this embodiment, contamination of the glass surface by metal components abraded off the reactor wall or the electrodes can be prevented with certainty. In the case of extremely high cleanliness demands, the inner surfaces of the reactor, subjected to the low-pressure plasma, are advantageously covered with a material which does not liberate any interfering contaminants under the process conditions for the treatment, according to the invention, of glass or ceramic items.

In principle, the electrodes may also be arranged within the reactor and the reactor may also comprise metal. However, suitable measures should be taken in order to prevent the transfer of metal particles onto the items treated according to the invention (in this respect, see: J. L. Vossen, Pure Appl. Chem. 52, pp. 1759–1765). When internal electrodes are used, the frequency of the field inducing the plasma can be selected from a direct current to a high frequency.

Alternatively, special microwave plasma reactors can also be used (for example according to U.S. Pat. No. 4,049,940), whereby, in particular, the internal cavities of hollow items can be processed according to the invention.

In the case of the advantageous use of the process, the construction of the reactor should ensure that the items to be coated are located in the brightly glowing zone of the discharge and are subjected to bombardment by ionized gas particles which are excited into a metastable state and also by UV irradiation. All those surfaces of items (of any shape) are coated which are in contact with the low-pressure plasma. Covered surfaces or those on which the items lie are not coated. The leak rate of the gas feed system and the reactor should be less than $10^{-6}$ $dm^3$ Pa/second in the case of the advantageous use of the process.

In order to coat planar items, the process according to the invention may also be carried out at pressures from 13.3 Pa (0.1 Torr) to $2.10^5$ Pa (2 atm), advantageously $1.10^5$ Pa (1 atm) when using corona discharge apparatuses. The frequency of the applied voltage can be selected from a direct current to a high-frequency voltage, but is usually 10–40 kHz. Depending on the pressure and electrode separation, the voltage is up to 20 kV.

Before carrying out the process according to the invention, residual organic contaminants are advantageously removed from the surface of the treated items and reactor inner wall, in the case of the advantageous use of the invention by means of a low-pressure plasma for 2–20 minutes using oxygen or air as discharge gas at a pressure of 26.6 Pa (0.2 Torr), for example, and a power density of 0.05 W/cm$^3$, for example, or microorganisms present are destroyed. In the case of planar items to be coated, a corona discharge may alternatively be used at, for example, atmospheric pressure, a voltage of 10 kV, a frequency of 10 kHz and a power of 1–10 kW.

The decisive, metal ion-removing step of the process according to the invention comprises treating the items with a plasma, in the case of the advantageous use of the process in a low-pressure plasma (at, for example, 26.6 Pa) or using a plasma induced by corona discharge. According to the invention, hydrogen, nitrogen or a noble gas, advantageously pure argon or helium, are used as discharge gas for this. Added amounts of air of 0.5% or more which originate, for example, from inadequate gas exchange or from a leak appeared to impair the success of the treatment. The process is thus preferably carried out at oxygen proportions of below 0.1%. It is presumed that other oxidizing gases, for example halogens, also hinder the removal of metal ions in the same fashion.

The power transferred from the electrical field to the low-pressure plasma can be between 0.01 and 1 Watt per cm$^3$ of plasma volume. In the advantageous use of the invention, it is in the region of 0.05 W/cm$^3$. The parameters pressure and power cannot be set completely independently of one another in the case of a low-pressure plasma, since only a certain power can be transferred to the low-pressure plasma in the case of a given reactor design and a given pressure. The higher the pressure and power, the more the surface of the treated-item is warmed by the low-pressure plasma treatment. In the case of the use, according to the invention, of a corona discharge, an advantageous use is produced, for example, at atmospheric pressure, a voltage of 6 kV, a frequency of 10 kHz and a power of 1–10 kW.

The duration of the plasma treatment is determined by the desired degree of depletion in metal ions. For alkali metal ions, it is typically in the range from several minutes to one hour. This process step also causes destruction of microorganisms.

The invention is distinguished by the following advantages:

(a) ready-made products of easy and cheap to process alkali metal-containing glasses or ceramic materials or enamelled objects can be coated after their final shaping.

(b) The parts to be coated need not be planar, but can have any shape.

(c) Planar glasses or glass fiber fabrics can be heated (which makes the treatment more intensive and deeperacting) or cooled (which makes the treatment more gentle and surface-selective). However, in contrast to the processes known hitherto, heating of the items to be coated is in no way necessary.

(d) The process according to the invention is very gentle. Apart from the coated surface layer, the properties of the treated items are not altered.

(e) The process according to the invention can easily be controlled via the parameters pressure, power, duration and, if appropriate, temperature.

(f) The process can be carried out using suitable plants which are already available commercially, for example RIE ("Reactive Ion Etching") plants, corona discharge plants or microwave reactors.

(g) The process according to the invention can particularly advantageously be integrated into vacuum production lines, as are used, for example, in microelectronics.

(h) It is easily possible to free the items to be coated of organic contaminants before starting the process according to the invention using an air plasma. This is important for constant coating quality.

(i) The treatment according to the invention has a sterilizing effect using any discharge gas.

(j) Only simple gases (noble gases, hydrogen, nitrogen, in addition, if appropriate, air or oxygen) are required in small amounts, otherwise no further chemicals. Polluting substances are not produced. Absolutely no residual chemicals or waste products have to be disposed of.

The process according to the invention is described below with reference to an illustrative embodiment.

An appropriate arrangement is represented schematically in FIG. 1. It is particularly suited for the coating of small glass items. A glass reactor (1) having a volume of 0.9 dm$^3$ is charged, after removal of a cap (2), with the glass items to be coated, resealed using the cap, and evacuated using a suitable rotary pump or a diffusion pump. The pressure is read off using an electrical vacuum gauge (3). The backflow of hydrocarbons from the pump is suppressed using a cold trap (4) or an absorption filter. Planar substrates (5) may, if required, by warmed to up to 250° C. in order to intensify the treatment. To this purpose, a hot oil is pumped from an oil thermostat (6) through a substrate holder (7). Cooling is also possible if a cooling thermostat is used alternatively. In order to clean organic contaminants from the surface of the glass items to be coated, these are initially subjected to an air plasma.

Air is metered in the evacuated reactor by means of a precision control valve (8), until a constant pressure of 26.6 Pa (0.2 Torr) is reached, and the low-pressure plasma is ignited by switching on a high-frequency generator (9). By means of a matching network (10), the reflected electrical power is minimized and the power consumed by the low-pressure plasma is adjusted to 40 W. The power consumed is determined using a wattmeter (11) as the difference between the input and reflected power. After the plasma has burnt for 20 minutes, the generator is switched off, the air input is terminated, and the reactor is pumped out to the lowest possible pressure.

In order to remove the metal ions from the surface layer of the glass items, a 30 minutes plasma treatment with argon (3 ring) at 26.6 Pa (0.2 Torr) and 40 W is now carried out in the fashion described. After the treatment, the reactor is ventilated via a ventilation valve (12) and the coated glass items are removed from the reactor.

Figure 4:
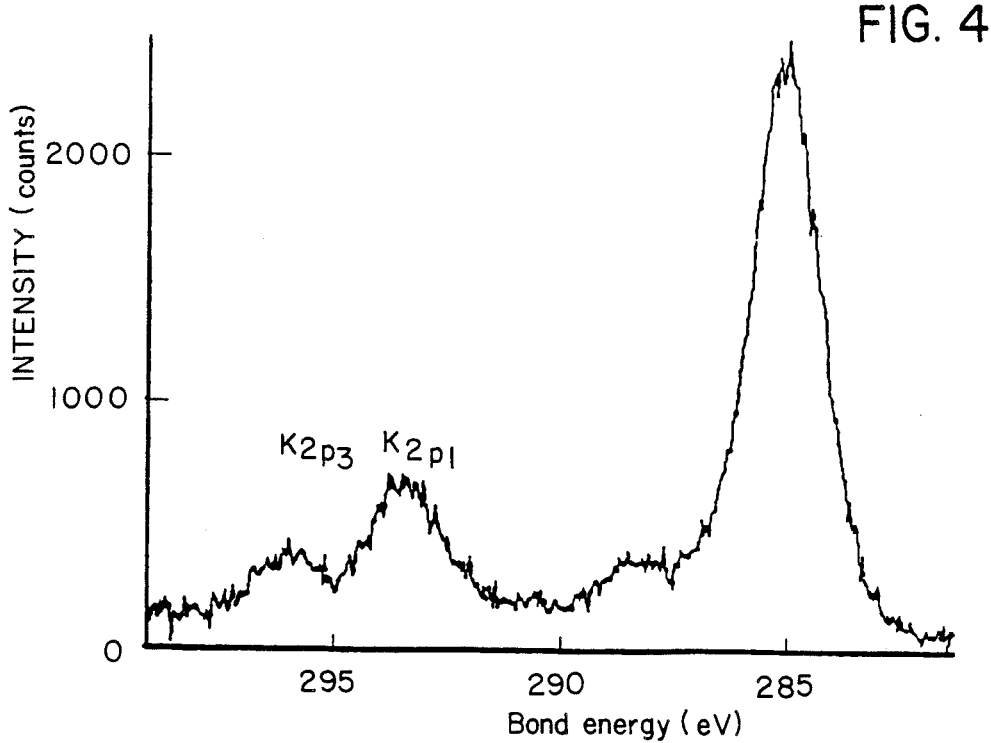
Figure 5:
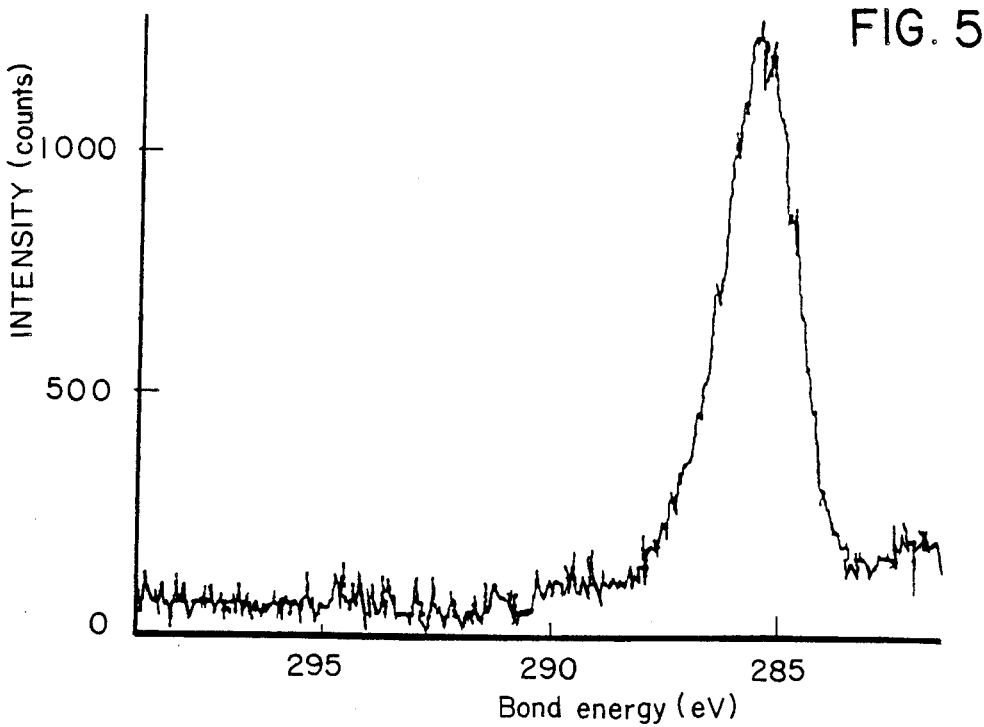
Figure 6:
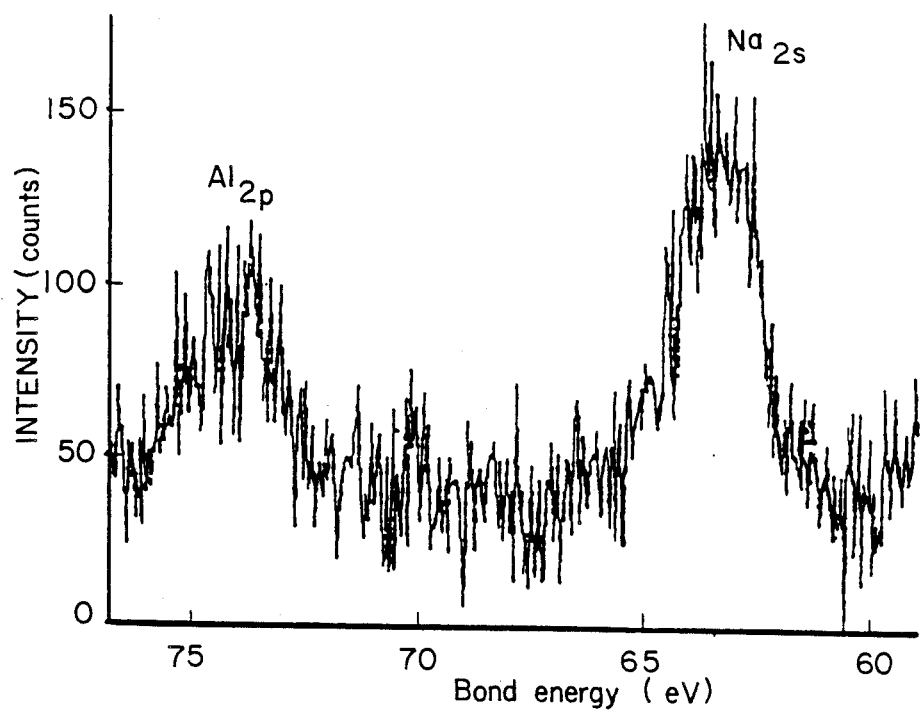
Figure 7:
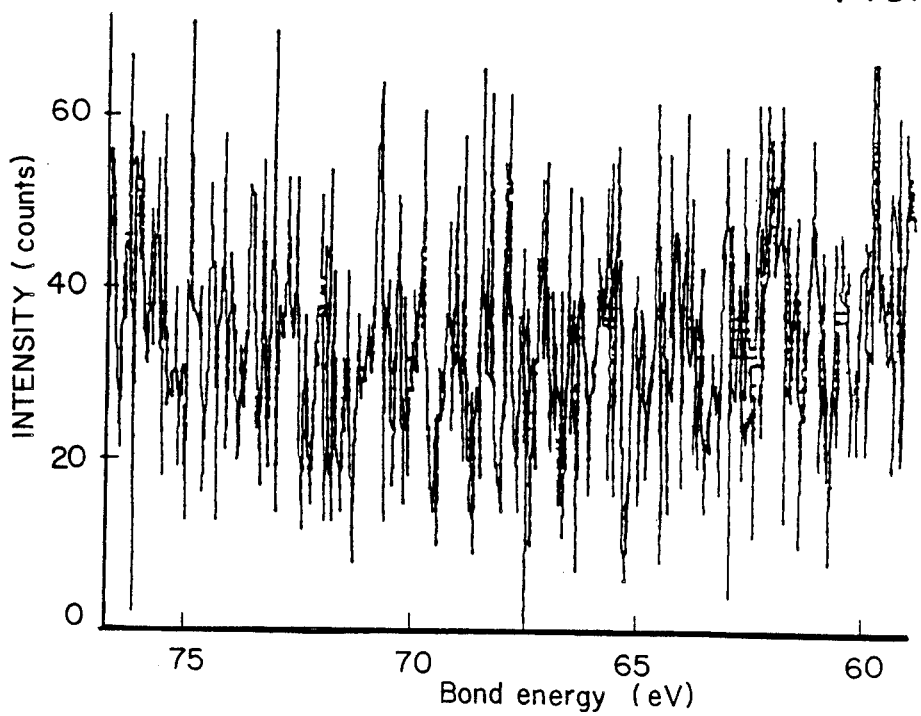

FIGS. 2 to 7 show ES(A ("Electron Spectroscopy for Chemical Analysis") spectra of two coverglasses for microscopy purposes, of which one remained untreated, and the other was subjected to the process, according to the invention, described in the illustrative embodiment. The overview spectra (FIGS. 2 and 3) show the signals of all the elements present in the glass surface. The absence of sodium and potassium signals can clearly be seen in FIG. 3. FIGS. 4 to 7 reproduce the potassium, sodium and aluminum signals at higher resolution. FIG. 4 shows the 2p$_3$ and 2p$_1$ signal of potassium at bond energies (B.E.) of 293.5 eV and 296.0 eV (the signals at 285 and 288.5 eV originate from carbon impurities) on the untreated glass surface; The potassium signals have disappeared on the glass surface treated according to the invention (FIG. 5). FIG. 6 shows the 2s signal of sodium (63.4 eV) and the 2p signal of aluminum (74.3 eV) on the untreated glass surface. FIG. 7 shows the corresponding region of the spectrum for the treated surface. The sodium and aluminum signals have disappeared. The ESCA spectra demonstrate that potassium, sodium and aluminum are removed from the surface layer of the glass by the process according to the invention.

Spectra of the same samples recorded one month later likewise exhibit no potassium, sodium and aluminum signals. This shows that the effect achieved is time-stable.

We claim:

1. A process for selectively removing metal ions from the surface layer of a glass or ceramic item having metallic ions, comprising the steps of:
    placing said item in a reactor;
    filling said reactor with a discharge gas comprising at least one gas selected from the group consisting of hydrogen, nitrogen and noble gases;
    using alternating current to create a plasma; and
    applying said plasma for a sufficient time to selectively remove said metal ions.

2. The process as claimed in claim 1, wherein the pressure of the plasma is selected greater than 1 Pa.

3. The process as claimed in claim 1, wherein the discharge gas is a noble gas selected from the group consisting of argon and helium.

4. The process as claimed in claim 1, wherein the proportion of foreign oxidizing gases in the discharge gas is less than 0.5%.

5. The process as claimed in claim 1, wherein the power density in the plasma is between 0.01 and 1 W per cm$^3$ of plasma volume.

6. The process according to claim 1, further comprising:
    freeing the glass or ceramic items from surface contaminants particularly organic deposits, in an oxygen containing discharge gas using a plasma prior to removing said metallic ions.

7. The process as claimed in claim 1, wherein the reactor comprises quartz glass, and has external electrodes or an external coil and the plasma is induced by means of a high-frequency alternating current of greater than 1 MHz.

8. The process as claimed in claim 1, wherein the reactor is at least partly constructed of metal and has internal electrodes.

9. The process as claimed in claim 1, wherein a microwave plasma reactor is used.

10. The process as claimed in claim 1, wherein a corona discharge, having a pressure of 10 Pa to $2 \times 10^5$ Pa, a voltage of 200 V to 30 kV, a current frequency of up to 1 MHz and an electrode separation of 0.5 mm to 10 mm, is used for inducing the plasma.

11. A process according to claim 10, wherein said discharge gas is non-oxidizing.

12. A process according to claim 1, wherein said plasma is a low pressure plasma.

13. A process according to claim 1, consisting essentially of the recited steps.

14. A process according to claim 1, wherein said discharge gas is non-oxidizing.

15. A process for removing metal ions from the surface layer of a glass or ceramic item containing homogeneously dispersed metal ions, comprising the steps of:
    placing a glass or ceramic item containing homogeneously dispersed metal ions into a reactor;
    filling the reactor with a discharge gas comprising at least one gas selected from the group consisting of hydrogen, nitrogen and noble gases;
    using alternating current to create a plasma which will selectively remove the metal ions from the surface layer of the glass or ceramic item; and
    applying the plasma for a sufficient time to remove the metal ions from the surface layer of the glass or ceramic item.

16. The process as claimed in claim 15, wherein the metal ions are alkali metal ions.

17. The process as claimed in claim 15, wherein the metal ions are selected from the group consisting of sodium, potassium and aluminum ions.

18. The process as claimed in claim 15, wherein the glass or ceramic item is a non-planar item.

19. The process as claimed in claim 15, wherein the glass or ceramic item is a glass optical fiber.

20. The process as claimed in claim 15, wherein the glass or ceramic item is a medicament container.

* * * * *